Oct. 21, 1924.

J. S. SURBAUGH

SHOVEL AND SCOOP BLADE

Filed March 18, 1922   2 Sheets-Sheet 1

1,512,720

Inventor:
J. S. SURBAUGH,

By Monroe E. Miller
Attorney.

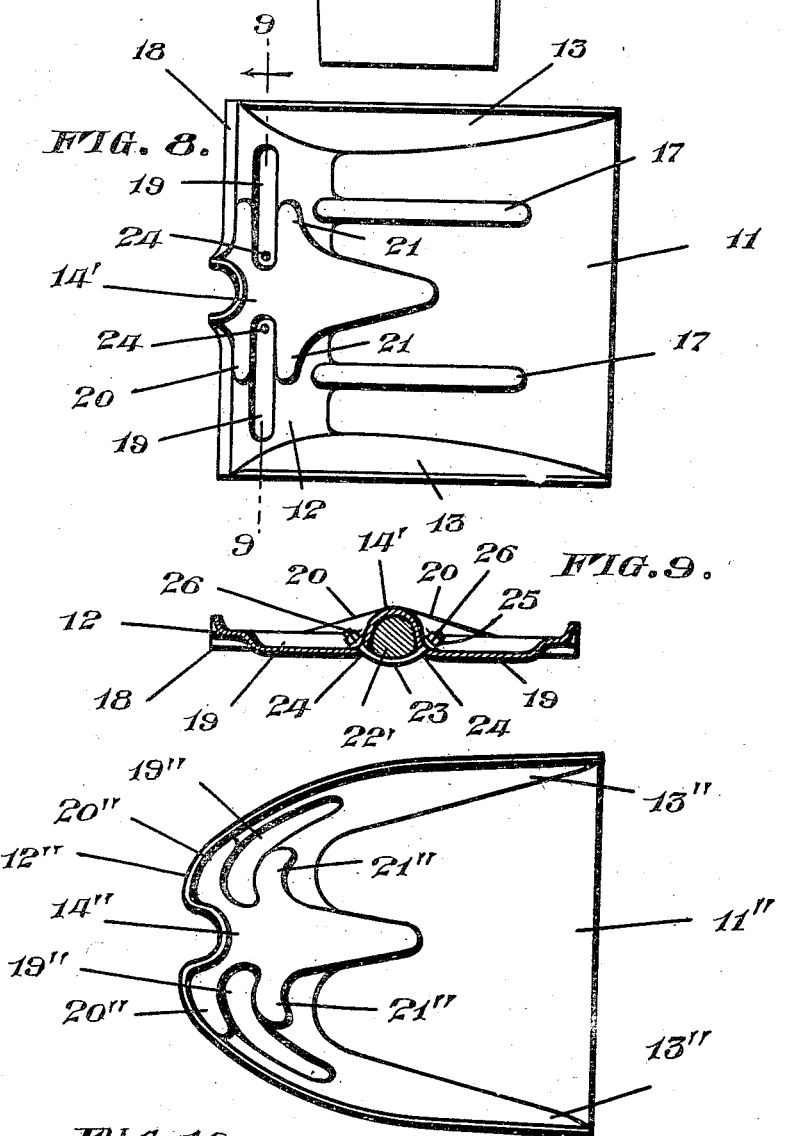

Patented Oct. 21, 1924.

1,512,720

UNITED STATES PATENT OFFICE.

JOHN S. SURBAUGH, OF VINCENNES, INDIANA.

SHOVEL AND SCOOP BLADE.

Application filed March 18, 1922. Serial No. 544,700.

*To all whom it may concern:*

Be it known that I, JOHN S. SURBAUGH, a citizen of United States, residing at Vincennes, in the county of Knox and State of Indiana, have invented certain new and useful Improvements in Shovel and Scoop Blades, of which the following is a specification, reference being had therein to the accompanying drawing.

The present invention relates to hollow-back shovel and scoop blades having upstruck rolls or frogs at the rear ends thereof, and the object of the invention is the novel formation of the blade at the opposite sides of the roll or frog so as to obtain added strength and reenforcement, in order to withstand the torsional, prying and twisting strains to which the implement is subjected in use.

Another object is the novel corrugation of the blade at the sides of the roll or frog to brace and strengthen the blade, as well as increasing the capacity thereof.

With the foregoing and other objects in view, which will be apparent as the description proceeds, the invention resides in the construction and arrangement of parts, as hereinafter described and claimed, it being understood that changes can be made within the scope of what is claimed, without departing from the spirit of the invention.

The invention is illustrated in the accompanying drawings, wherein—

Fig. 7 is a plan view of the blank from which a second form of blade is stamped.

Fig. 8 is an enlarged plan view of such second form of blade.

Fig. 9 is a transverse section on the line 9—9 of Fig. 8 showing a handle member or shank clamped in the roll or frog.

Fig. 10 is a plan view of another modified form of blade for use in scoops.

Figure 1:
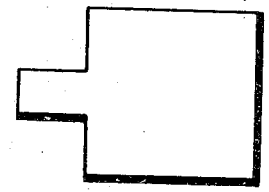
Figure 1 is a plan view of the blank from which the handle-socketed type of blade is formed.
Figure 2:
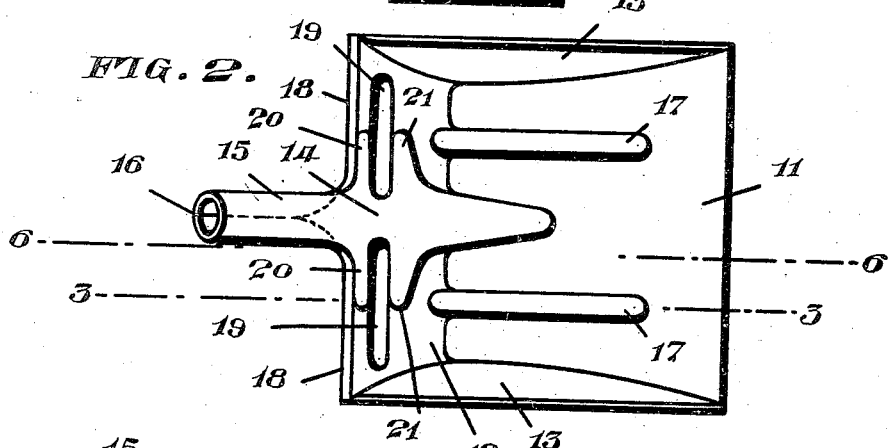
Fig. 2 is a plan view of the completed handle-socketed blade on a larger scale than Fig. 1.
Figure 3:
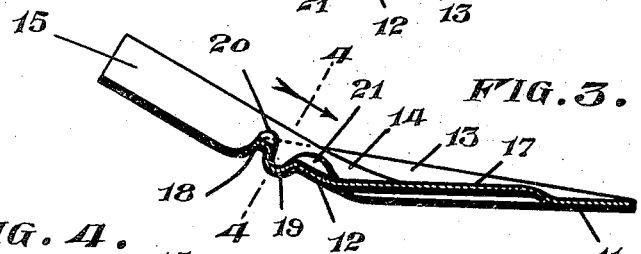
Fig. 3 is a longitudinal vertical section on the line 3—3 of Fig. 2.
Figure 4:
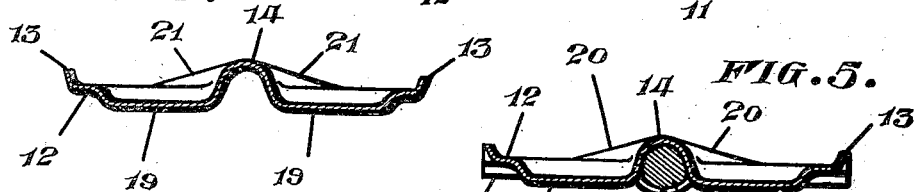
Fig. 4 is a section on the line 4—4 of Fig. 3.

The shovel blade illustrated in Fig. 2 is stamped or pressed from the blank of suitable sheet metal, as seen in Fig. 1, and comprises the flat body portion or bottom 11, with a rear inclined or upwardly deflected wall or back 12 and the inclined or upwardly deflected side walls 13, such walls being integral with and upturned from the body portion or bottom and the walls also being integral at their junctures at the rear corners of the blade. This hollow-back type of blade is formed, as usual, with a longitudinal upstruck roll or frog 14 midway between the sides and extending from the rear end of the blade or edge of the back 12 across the juncture or bend between the back 12 and body portion 11, with the forward end of the roll or frog terminating within and merging into the body portion 11 near the center of said body portion. The roll or frog tapers or decreases in width forwardly from its rear end, and braces or reenforces the blade for transmitting the strains between the handle member and blade in an effective manner. In this type of blade, as shown, a tubular handle socket 15 extends rearwardly from the roll 14, as a continuation of said roll, with its edge portions bent downwardly and meeting, as at 16, so that a handle member or shank can be fitted and secured within the tubular socket, as well known.

The blade is further strengthened and reenforced by upstruck longitudinal ribs or corrugations 17 located at opposite sides of the roll between the roll and sides 13, and pressed upwardly from the body portion 11 with their forward ends terminating short of the forward end of the blade and their rear ends preferably extending across the bend or corner between the body portion and back and merging into and united with the back, so that said ribs or corrugations not only stiffen the body portion 11, but also strengthen and brace the blade at the bend or corner between the body portion and back.

Flanges or lips 18 are bent downwardly from the rear edge of the back wall 12, or rear end of the blade, to stiffen the blade at this point, and to also receive the pressure from the foot when the shoe is placed against the rear end of the blade to shove it ahead. The inner or adjacent ends of the flanges 18 merge into the forward ends of the longitudinal meeting edges of the split tubular socket 15, thereby strengthening or bracing the handle socket where it is united with the blade proper.

In order to reenforce and brace the blade between the roll 14 and back 12, said back is formed with depressed corrugations or channels 19 extending below the normal lower surface of the blade, transversely of the blade from the opposite sides of the roll or frog. These corrugations aline with one another and are located near but spaced from the rear edge of the back 12, and are also spaced from the juncture between the body portion 11 and rear wall 12 of the blade. The inner or adjacent ends of the corrugations merge into the side walls of the frog, while the outer or opposite end of said corrugations terminate short of the junctures or bends between the back and side walls. These corrugations will stiffen or strengthen the blade transversely across the rear portion thereof, and, at the same time, will increase the capacity of the blade. These corrugations or depressions will receive the material and by adding a slight amount to each shovel full will add an appreciable quantity of material to the aggregate handled in the course of a day's work. The additional load is held by the blade near its rear end as close to the hands of the operator as possible—a desirable feature in shovel implements. Furthermore, the corrugations or depressions 19 provide fulcrums to contact with the floor or surface when the handle is depressed, in using the implement for prying up the material over the blade. The depressions 19 are immediately in rear of the bend between the body portion 11 and back wall 12 of the blade, and said corrugations project below the plane of the back wall 12, so that when the blade is rocked on the bend between said body portion and back wall, to raise the forward edge of the blade, the corrugations 19 will contact with the floor or surface, when the forward edge of the blade is slightly raised, and further rocking motion will cause the blade to be rocked on the corrugations 19 as fulcrums, so that the corrugations 19 and braces 20 and 21 take up the strains. The bracing or reenforcement by the corrugations or depressions 19 is supplemented by upstruck braces 20 and 21 extending from the opposite sides of the roll or frog in rear and in front of the corrugations or grooves 19, respectively. The braces 20 are located between the corrugations 19 and flanges 18, while the braces 21 are located immediately in front of said corrugations and in rear of the corner or bend between the body portion 11 and back 12. Said braces are struck upwardly from the back with the roll 14 and are united with the sides of the roll into which the larger ends of said braces merge, and said braces taper or decrease in width and height from the roll toward the opposite sides, with their outer terminals merging into the back wall 12 between the ends of the corrugations. Such braces will add considerable strength to the blade, and with the corrugations 19 between them will enable the blade to successfully withstand torsional, prying and twisting strains between the handle and blade. The blade thus has considerable strength transversely of the roll or frog because of the provision of the corrugated portions extending from the opposite sides of said frog.

Figure 5:
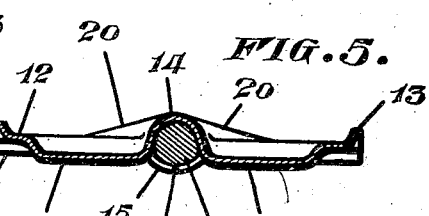
Fig. 5 is a section on the same line as Fig. 4 looking in the opposite direction and showing the handle member or shank in the socket.
Figure 6:
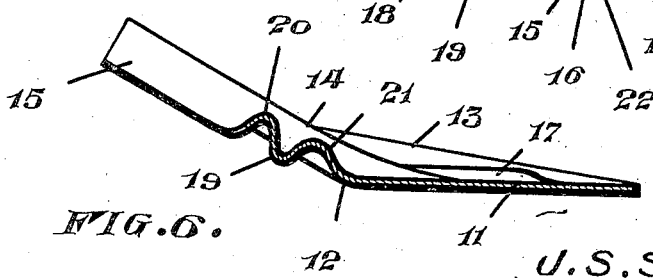
Fig. 6 is a longitudinal vertical section on the line 6—6 of Fig. 2.

Fig. 5 shows the handle member or shank 22 fitted into the socket 15.

The blade shown in Fig. 8 is stamped from a sheet metal blank as shown in Fig. 7, and the blade is of the same construction and formation as the blade shown in Fig. 2, excepting that the handle socket is omitted, so that the roll or frog 14' ends at the rear end of the blade and does not have the handle socket continuation as in the first form. In this type of blade, the handle member or shank is fitted and secured under and within the roll or frog 14' by any suitable means, such as disclosed in Patents Nos. 1,312,766 and 1,374,336 granted to me on August 12, 1919 and April 12, 1921, respectively, or the securing means can be used as disclosed in my copending application Serial No. 501,319, filed Sept. 17, 1921. The securing means of said application is disclosed in Fig. 9, wherein a curved resilient or flexible bolt 23 extends through apertures 24 under the handle member or shank 22', and said bolt has a nut 25 threaded thereon whereby the bolt or securing member in being tightened will tend to straighten out, and thereby clamp the handle member against the crown of the roll or frog. With this arrangement, the apertures 24 can be located within the inner or adjacent end portions of the depressed corrugations or grooves 19, and convexed washers 26 can be fitted on the end portions of the bolt to seat snugly in said corrugations or depressions. The terminals of the bolt are thus housed within the corrugations or depressions, so as to be out of the way. By locating the apertures 24 in the corrugations or depressions 19, said apertures and the terminals of the bolt are located below the plane of the back wall 12 of the blade, and the bolt 16 need not be bent or curved as much as when the apertures are in or above the plane of said back wall. The apertures 24 are thus located nearer to the plane of the bottom surface of the handle member. The blade is thus also strengthened or braced where the securing means is located for clamping the handle member within the roll.

Fig. 10 shows a scoop type of blade having the body portion or bottom 11″, with the upturned back and side walls 12″ and 13″, respectively, that merge one into the other along curved lines, instead of having the rear corner angles as in the shovel blades as seen in Figs. 2 and 8 of rectangular forms. In the scoop blade the rear and side walls are of semi-elliptical form, and the roll or frog 14″ is upstruck from the rear wall and rear portion of the bottom 11″, the same as in the other forms. The corrugations or depressions 19″ and braces or upstruck corrugations 20″ and 21″, however, are curved forwardly to conform to the curvature of the walls or upturned portions of the blade. Thus, the upstruck and downstruck corrugations which extend from the sides of the roll or frog diverge forwardly along curved lines, according to the curvature of the back and side walls of the blade, instead of being disposed transversely as in Figs. 2 and 8.

Having thus described the invention, what is claimed as new is:—

1. A sheet metal blade having an upstruck roll and depressions below the normal lower surface of the blade and extending from the sides of the roll, said depressions forming fulcrums on which the blade can be rocked.

2. A sheet metal blade having an upstruck roll, depressed corrugations below the normal lower surface of the blade, extending from the opposite sides of said roll, and upstruck inclined tapered braces having their larger ends merging into the sides of the roll, said braces extending from the sides of the roll at the opposite sides of said corrugations, and said corrugations forming fulcrums on which the blade can be rocked.

3. A sheet metal blade having a longitudinal upstruck roll extending from its rear edge at the rear end, downturned flanges at its rear end with their adjacent ends extending to said roll, and corrugations adjacent to said flanges extending from and merging into the opposite sides of the roll, said corrugations being below the normal lower surface of the blade and forming fulcrums on which the blade can be rocked.

4. A sheet metal blade having an upstruck roll for receiving a handle member, the blade having depressions extending from the sides of the roll and apertures in said depressions at the sides of the roll below the normal lower surface of the blade for receiving securing means for the handle member.

5. A sheet metal blade having an upstruck roll for receiving a handle member, the blade having depressions extending from the sides of the roll and apertures in said depressions at the sides of the roll below the normal lower surface of the blade, and securing means for the handle member to extend through said apertures and having portions to seat in said depressions.

6. A sheet metal blade having a body portion, an inclined rear wall and a roll upstruck from said rear wall and body portion, and depressions in said rear wall forming fulcrums on which a blade can be rocked.

In testimony whereof I hereunto affix my signature.

JOHN S. SURBAUGH.